(12) United States Patent
Matthews et al.

(10) Patent No.: US 10,542,071 B1
(45) Date of Patent: Jan. 21, 2020

(54) EVENT DRIVEN HEALTH CHECKS FOR NON-HTTP APPLICATIONS

(71) Applicant: Amazon Technologies, Inc., Seattle, WA (US)

(72) Inventors: Nicholas Channing Matthews, Seattle, WA (US); Joshua Campbell, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 97 days.

(21) Appl. No.: 15/277,842

(22) Filed: Sep. 27, 2016

(51) Int. Cl.
*H04L 29/08* (2006.01)
*H04L 12/26* (2006.01)
*H04L 29/06* (2006.01)

(52) U.S. Cl.
CPC ............ *H04L 67/025* (2013.01); *H04L 43/10* (2013.01); *H04L 65/1006* (2013.01); *H04L 67/1014* (2013.01)

(58) Field of Classification Search
CPC ... H04L 67/025; H04L 43/10; H04L 65/1006; H04L 67/1014; H04L 41/0631; H04L 67/1012; H04L 41/0213; H04L 67/1002; H04L 67/28; H04L 67/2804; H04L 41/0681; H04L 41/0816; H04L 43/0888; H04L 67/02; H04L 67/1008; H04L 67/1029; H04L 67/1031; H04L 67/1097; H04L 67/12; H04L 67/16; H04L 67/20; H04L 67/36; H04L 67/42; H04L 69/22; H04L 41/046; H04L 41/142; H04L 41/147; H04L 41/16; H04L 41/5041; H04L 41/5096; H04L 43/02; H04L 43/04; H04L 43/062; H04L 67/00; H04L 67/1027; H04L 67/1034; H04L 67/143; H04L 67/32; H04L 67/327; H04L 67/34; G06F 2009/45595; G06F 9/45558; G06F 11/07; G06F 2009/45562; G06F 9/455; G06F 11/008; G06F 11/0709; G06F 11/0721; G06F 11/0757; G06F 11/0763; G06F 11/0778; G06F 11/3006; G06F 11/3013; G06F 11/302; G06F 11/3027; G06F 11/3072; G06F 11/3096; G06F 11/321;
(Continued)

(56) References Cited

U.S. PATENT DOCUMENTS 6,385,644 B1 * 5/2002 Devine ............... G06F 11/0709
709/206
7,143,153 B1 * 11/2006 Black .................. H04L 41/0681
709/223
(Continued)

*Primary Examiner* — Greg C Bengzon
(74) *Attorney, Agent, or Firm* — Patterson + Sheridan, LLP

(57) ABSTRACT

Techniques are disclosed for monitoring the health of a computing application, system or service. A health monitoring service performs event driven health status checks for applications that use non-HTTP workloads. To do so, heath status messages (e.g., HTTP status requests) are directed to an API gateway at a specified frequency. In response to each health status message, the API gateway triggers at least a first event driven function to perform a health check of an application. Results of the health-status check performed by the first event driven function may be written to a status database. Further, results of the first event driven function can result in additional event driven functions being triggered (e.g., to remove an unhealthy application from production use).

21 Claims, 7 Drawing Sheets

(58) Field of Classification Search
CPC .. G06F 11/34; G06F 11/3409; G06F 11/3466; G06F 11/3612; G06F 11/3624; G06F 12/0808; G06F 13/10; G06F 17/30241; G06F 17/3053; G06F 17/30554; G06F 17/30598; G06F 17/30604; G06F 17/30867; G06F 17/30902; G06F 19/321; G06F 2009/4557; G06F 2009/45587; G06F 2009/45591; G06F 21/53; G06F 3/0482; G06F 3/04842; G06F 3/04847; G06F 9/5055; G06F 9/5083; G06F 9/54; G06F 9/542; G06N 7/005; G06N 99/005; H04W 24/02; H04W 24/10; H04W 28/08; H04W 4/001; H04W 4/50; H04W 72/08; H04W 84/18; H04W 88/16
See application file for complete search history.

(56) References Cited

U.S. PATENT DOCUMENTS

| | | | | |
|---|---|---|---|---|
| 7,818,754 | B2* | 10/2010 | Morris | G06F 11/3409 710/48 |
| 8,843,940 | B2* | 9/2014 | Bharathula | G06F 11/3006 719/313 |
| 9,052,938 | B1* | 6/2015 | Bhide | G06F 9/45533 |
| 9,699,061 | B2* | 7/2017 | Gedam | H04L 43/16 |
| 9,747,183 | B2* | 8/2017 | Bhattacharya | G06F 11/3027 |
| 9,871,849 | B2* | 1/2018 | Chauhan | H04L 67/10 |
| 10,089,220 | B1* | 10/2018 | McKelvie | G06F 11/0775 |
| 10,135,703 | B1* | 11/2018 | Gupta | G06F 16/278 |
| 2004/0264481 | A1* | 12/2004 | Darling | H04L 29/06 370/401 |
| 2005/0055435 | A1* | 3/2005 | Gbadegesin | H04L 29/06 709/224 |
| 2005/0188220 | A1* | 8/2005 | Nilsson | H04L 63/04 726/5 |
| 2007/0083813 | A1* | 4/2007 | Lui | G06F 11/3612 715/709 |
| 2007/0192863 | A1* | 8/2007 | Kapoor | G06F 9/505 726/23 |
| 2008/0114873 | A1* | 5/2008 | Chakravarty | H04L 41/0613 709/224 |
| 2008/0225720 | A1* | 9/2008 | Khemani | H04L 29/12594 370/235 |
| 2008/0262990 | A1* | 10/2008 | Kapoor | G06F 9/505 706/20 |
| 2010/0121975 | A1* | 5/2010 | Sinha | H04L 65/103 709/231 |
| 2010/0131473 | A1* | 5/2010 | Bjork | G06F 11/3006 707/690 |
| 2010/0281102 | A1* | 11/2010 | Chinta | G06F 21/53 709/203 |
| 2010/0287406 | A1* | 11/2010 | Ishii | H04L 45/22 714/4.1 |
| 2011/0153724 | A1* | 6/2011 | Raja | H04L 67/325 709/203 |
| 2011/0154471 | A1* | 6/2011 | Anderson | G06F 9/54 726/11 |
| 2011/0320889 | A1* | 12/2011 | Balasubramanyan | G06F 11/0757 714/55 |
| 2012/0059934 | A1* | 3/2012 | Rafiq | H04L 67/1008 709/225 |
| 2012/0173759 | A1* | 7/2012 | Agarwal | H04L 67/2814 709/241 |
| 2012/0240182 | A1* | 9/2012 | Narayanaswamy | G06F 9/5077 726/1 |
| 2013/0336104 | A1* | 12/2013 | Talla | H04L 45/245 370/216 |
| 2014/0130150 | A1* | 5/2014 | Moshchuk | G06F 11/30 726/22 |
| 2014/0303934 | A1* | 10/2014 | Mylarappa | G06F 11/3006 702/186 |
| 2014/0304352 | A1* | 10/2014 | Chaudhary | G06F 9/5011 709/208 |
| 2014/0304355 | A1* | 10/2014 | Kamath | H04L 67/2842 709/213 |
| 2014/0304361 | A1* | 10/2014 | Chauhan | H04L 67/1097 709/216 |
| 2014/0304393 | A1* | 10/2014 | Annamalaisami | H04L 43/04 709/224 |
| 2015/0128156 | A1* | 5/2015 | Zhu | G06F 8/74 719/328 |
| 2015/0220376 | A1* | 8/2015 | Srivastava | G06F 11/327 714/37 |
| 2016/0098337 | A1* | 4/2016 | Ekambaram | G06F 11/3409 719/318 |
| 2016/0162389 | A1* | 6/2016 | Lachwani | G06F 11/3664 714/38.14 |
| 2016/0314032 | A1* | 10/2016 | Sengupta | G06F 11/076 |
| 2017/0006132 | A1* | 1/2017 | Sorenson, III | H04L 67/32 |
| 2017/0054571 | A1* | 2/2017 | Kitchen | H04L 12/2818 |
| 2017/0111220 | A1* | 4/2017 | Kumar | H04L 41/0803 |
| 2018/0024873 | A1* | 1/2018 | Milliron | G06F 9/466 |
| 2018/0054452 | A1* | 2/2018 | Muddu | G06F 16/254 |

* cited by examiner

US 10,542,071 B1

EVENT DRIVEN HEALTH CHECKS FOR NON-HTTP APPLICATIONS

BACKGROUND

Hypertext transfer protocol (HTTP) a widely used networking protocol for exchanging messages between computing systems. The HTTP protocol specifies how messages are formatted and transmitted along with what actions servers, browsers, and other applications using this protocol should take in response to various commands.

Sending HTTP messages to an application, service, or system is a common technique for monitoring the health or status of an application or service which uses HTTP as a protocol to transport workloads. For example, DNS and load balancing services frequently use HTTP messages as a health check of a destination address resolved by DNS or of a server picked to process a load balanced requested. Such a health check message generally helps ensure that a destination target is healthy before sending traffic towards that destination target. To do so, e.g., a DNS server typically sends an HTTP message to a specified port (e.g., port 80) of a target address resolved from a domain name. If an HTTP status code of 200 is received, the server is presumed to be healthy. Typically, however, health checking services assume the workload of the application being monitored rely on HTTP or at least have different availability or capabilities for HTTP. That is, the HTTP health check is typically limited to confirming that a server (e.g., a web server) is listening on a given port (e.g., port 80), without the ability to check or evaluate the functioning of any applications or services on that host. This approach results in both false positive and false negatives. Further, currently available HTTP health check mechanisms are relatively slow, e.g., on an order of minutes before a problem is detected and cloud computing providers typically limit how frequently an HTTP-based health check can be performed, e.g., once a minute. At the same time, using HTTP for health checks is beneficial in that it is very easy to configure and use, since it is plain text communication over a commonly accepted port.

As noted, for some non-HTTP workloads, however, simply responding to an HTTP status or hello message is insufficient to confirm a health status of a server. For example, consider a firewall appliance used to monitor all traffic flows through the appliance in front a private network. Given the importance of a network firewall in many contexts, any outage needs to be detected rapidly, and once detected, it is important that a system administrator react as quickly as possible, e.g., by rerouting to a standby firewall appliance, pulling a appliance from a load balancing pool, changing network routes, etc. However, a simple HTTP status check may be unable to accurately determine a health status of a firewall. That is, that the firewall is responsive to HTTP status message does not confirm that the firewall is properly filtering traffic according to a specific set of rules.

In addition to using HTTP status messages as a health check for applications or appliances, a variety of instance-based applications support simple operations like periodically pinging a server or checking for open ports. However, like the HTTP status message, these approaches are often unable to accurately determine a health status of a server, application or service, beyond confirming that the server, application or service, responds to an ICMP ping message (or similar message). That is, while an application may respond to a ping message, this alone frequently does not provide an indication that the application or services hosted by a server are operating in a healthy manner.

BRIEF DESCRIPTION OF DRAWINGS

Various embodiments in accordance with the present disclosure will be described with reference to the drawings, in which.

DETAILED DESCRIPTION

Figure 1:
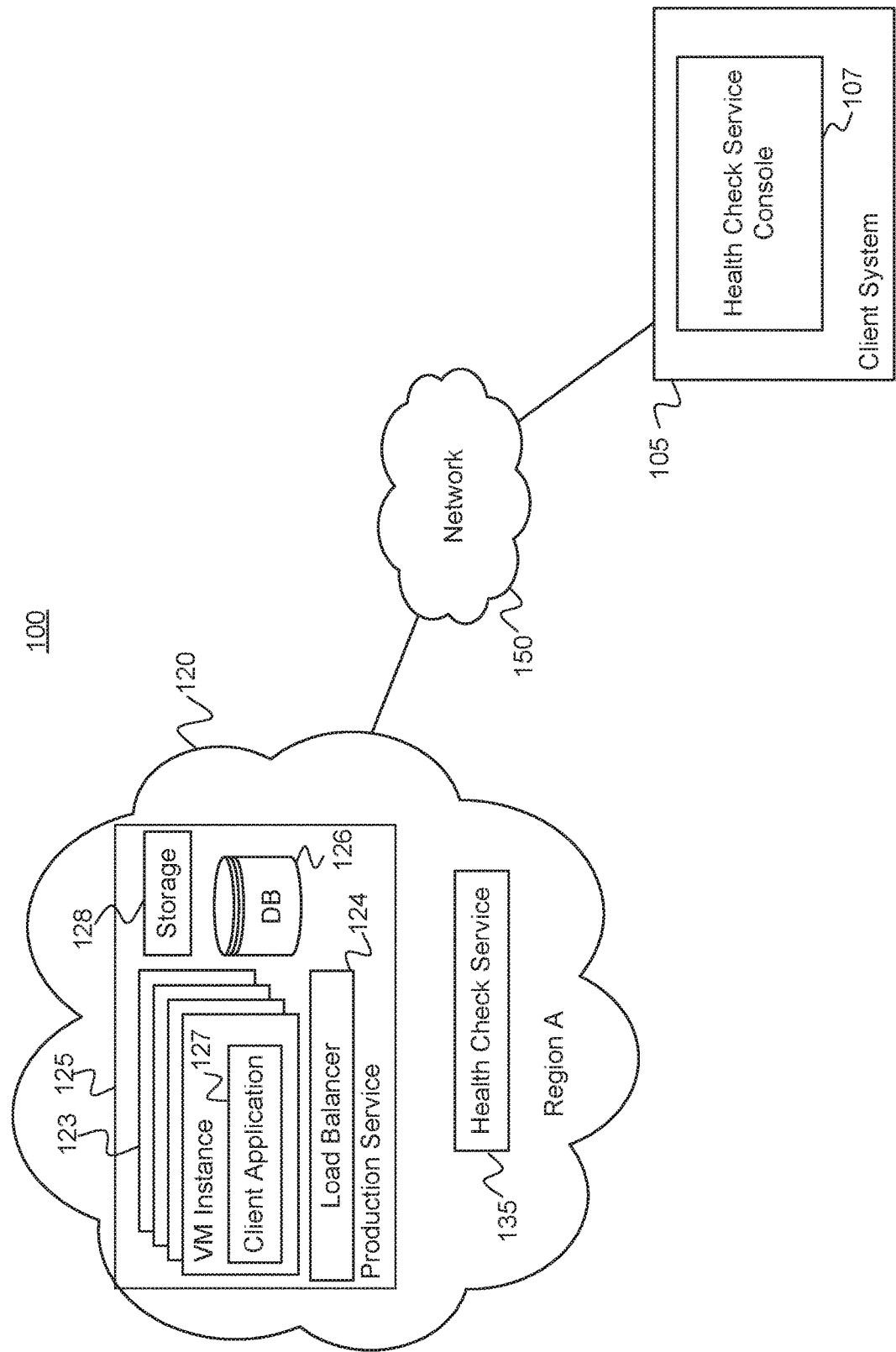
FIG. 1 illustrates an example of a cloud computing environment hosting an application used to provide event driven health checks for non-HTTP application, according to one embodiment.

As noted, current health check services available from cloud computing providers typically offer a generic health check using HTTP messages. Such health checks are limited to determining whether an application is listening on a port, e.g., port 80. Embodiments presented herein provide techniques for monitoring the health of a computing application, system or service. More specifically, embodiments presented herein provide a health monitoring service that can perform event driven health status checks for applications that use non-HTTP workloads. As described herein, an event driven health check can perform any set of actions needed to evaluate the then-current health status of an application. In one embodiment, an event driven function is invoked to perform a health check of an application. Further, the results of a health-status check performed by such an event driven function can result in additional event driven functions being performed. For example, a health status check which identifies an application as being in an unhealthy state may trigger an event to restore the unhealthy application to a healthy state or to remove that application from service (e.g., an event driven function invoked to remove the unhealthy application from a pool of applications receiving requests from a load balancer).

In addition to performing detailed health checks of an application using event driven functions, embodiments presented herein provide a health check service that can perform health checks at very high frequencies. Unlike current health check services offered by cloud computing providers, which are often limited in frequency to once per minute, embodiments presented herein provide a health check service which can perform health status checks at virtually any specified frequency to ensure that an application which transitions into an unhealthy state is identified and restored or removed from service as rapidly as needed in a particular case. Further, event driven functions can be triggered by a health status check that identifies an application as having transitioned from an unhealthy state to a healthy state, e.g., an event driven function invoked to return a healthy application to a pool of applications receiving requests from a load balancer).

In one embodiment, an event driven health service may include an API gateway endpoint, status functions, notification queues, and persistent databases. Further, the event driven health service presented herein can support of very high input/output and very frequent health checks of an application, while also addressing concurrency issues, idempotency, and can support a variety of protocols, ports, and parameters in performing health status checks. Note, some embodiments are described herein relative to an example of a health check service which uses a variety of services hosted by a cloud computing provider, e.g., compute, database, storage, and networking services, etc., to perform health status checks of an application or service. However, one of skill in the art will readily recognize that embodiments presented herein may be adapted for applications and services hosted directly by an enterprise computing infrastructure.

Note, for convenience, embodiments of the invention are described below using the well-known HTTP protocol as an example protocol used to send messages to an API gateway, which, in turn, trigger event driven health checks for non-HTTP applications. Of course, one of skill in the art will readily recognize that other protocols could be used to send messages to an API gateway. For example, the secure variant of HTTP, HTTPS could be used. Further, other protocols such as Session Initiation Protocol (SIP) could be used to transmit messages to an API gateway in a manner recognized by an event driven function. In such a case, session parameters passed with the SIP messages could encode parameters used to identify hosts, select tests or provide other parameters for performing a health status check against a non-HTTP application. For example, a SIP proxy could route SIP requests to event driven function in order to trigger a health status check of a host identified in the SIP request. As another example, ICMP could be used to send ping messages to an API gateway. In such a case, a ping message could include a payload, e.g., a URL or IP address recognized by an event driven function as triggering a health status check.

FIG. 1 illustrates an example of a cloud computing environment hosting an application used to provide event driven health checks for non-HTTP application, according to one embodiment. As shown, the computing environment 100 includes a client computing system 105 and a cloud computing region—region A 120 connected to a public computing network 150 (e.g., the internet).

Cloud computing region 120 generally corresponds to a region defined by a service provider in offering cloud-based services to clients (e.g., services used to build production service 125). While a service provider may define a cloud computing region along arbitrary boundaries, cloud computing regions often correspond to geographic, national, or fault tolerance boundaries, where computing resources in one region are deployed and managed in a manner that is generally isolated from other regions. For example, cloud computing region 120 may correspond to a data center (or data centers) located in a particular geographic area. Data centers in different regions may help provide fault-tolerant web services, e.g., should a data center in one region become inaccessible, other data centers in that region (or other regions) may continue to operate with little or no interruption to the web services hosted in such regions. Further, the provider may enable multiple physical or logical zones within a given cloud computing region. For example, a single data center used to provide a cloud computing region may offer multiple, fault tolerant availability zones, where a service disruption in one availability zone should not impact other availability zones within the same cloud computing region (or other regions) and the availability zones within a region may provide inexpensive, low-latency network connectivity to other availability zones within the same region.

In the example of FIG. 1, assume an enterprise customer has deployed a production service 125 in region 120. As shown, production service 125 includes a set of virtual machine (VM) instances 123, a database 126, and persistent storage 128. In addition, the production service 125 includes a load balancer 124 used to distribute requests received by the production service 125 to an instance of client application 127 on one of the VM instances 123. For discussion, assume the production service 125 provides an ecommerce website. In such a case, the client application 127 on VM instances 123 could each provide web and application servers configured to access database 126 and storage 128 as needed in order to process HTTP requests received from client browsers. As requests are received, a load balancer 124 distributes the HTTP requests to an application 127 on one of the VM instances 123. In turn, application 127 may read and write data related to customer requests or purchases to the database 126 and storage 128. Further, production service 125 could also incorporate a variety of other computing services offered by the cloud provider. For example, the count of VM instances 123 used by production service 125 could be increased or decreased based on demand using an auto-scaling service.

Illustratively, the provider of cloud computing region 120 may host a health check service 135 as part of the computing services offered to customers. As described in greater detail below, the health check service 135 may be used to monitor a health status of the production service 125 as well as monitor an ongoing health status for any of the components underlying the production service 125.

Client system 105 is included to be representative of a general purpose computing system such as desktop and laptop systems, as well as mobile computing devices such as tablets and smart phones configured with service console applications, web browser applications, or development tools. In this particular example, client system 105 includes a console application 107. The console application 107 generally provides a software application (or web-based interface) used to configure the health check service 135 to monitor the components of the production service 125. For example, in one embodiment, a systems administrator (or other appropriate party) may specify a frequency at which event driven health status checks should be triggered, as well as specify a set of one or more functions (or other components of application logic) to invoke as part of each health status check.

For example, a systems administrator could specify that the health status of a firewall appliance should be tested once per second. Further, in such a case, the functions could specify what actions to perform to determine the health status of the firewall appliance. For example, the functions could be configured to dynamically generate network traffic that should either pass or be dropped by the firewall appliance, forward such traffic towards the firewall appliance, and observe whether the network traffic is processed as expected. If so, the health check service 125 may update a status database indicating the firewall appliance is healthy. If the firewall appliance does not manage the network traffic as expected by the function, then the status database could be updated to indicate the firewall appliance was identified by a health status check as being unhealthy. Further, in one embodiment, if the firewall appliance failed a specified number of health status checks, the heath check service could trigger another event used to evaluate the appliance, remove the appliance from service and start directing traffic towards another firewall appliance, etc. In other cases, event driven functions monitoring health status of an application could send out notifications, send a message to a queue, remove an application 127 from a target list used by a load balancer 124 or a DNS zone, change a routing table, move an IP address, etc.

Figure 2:
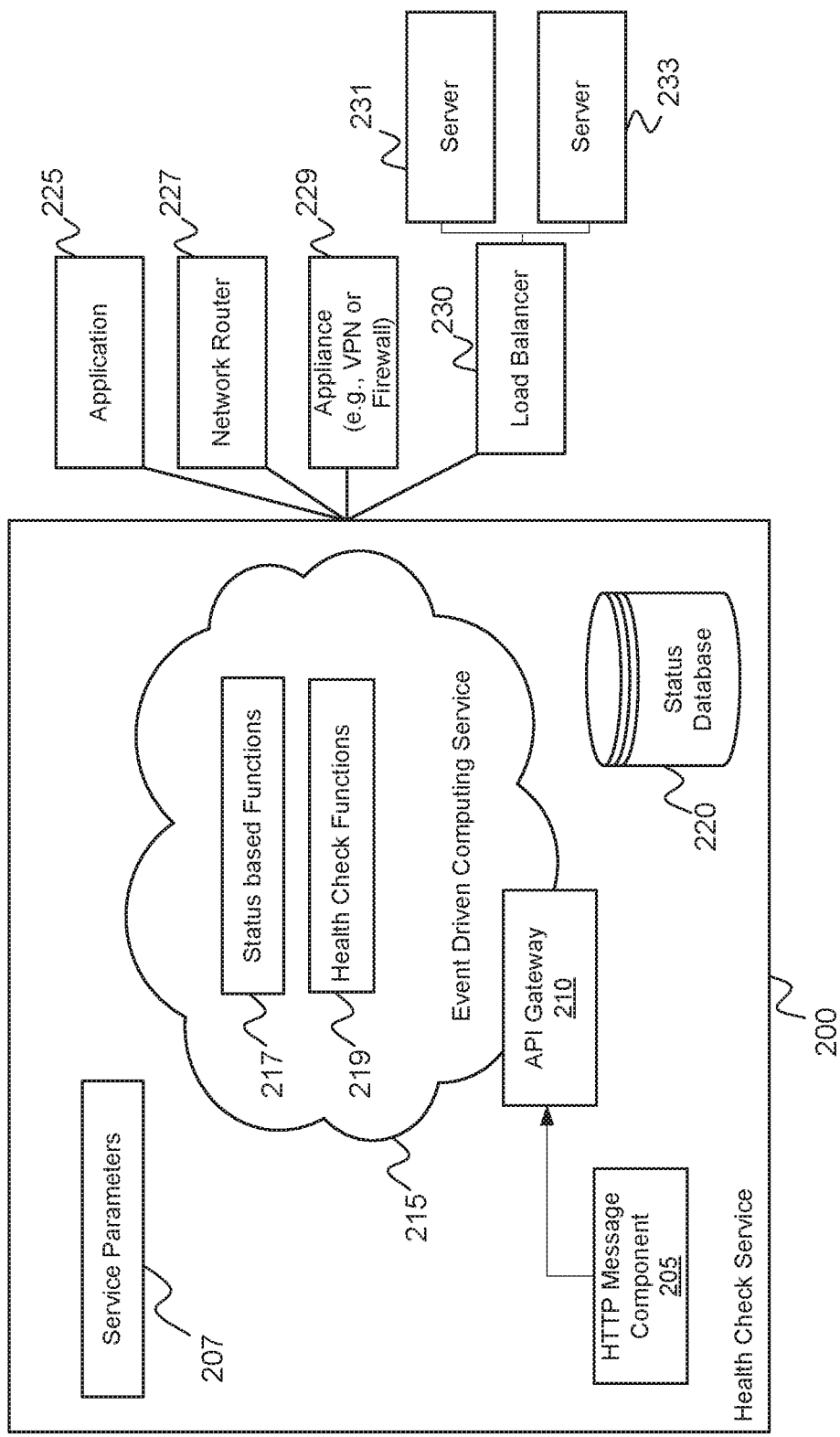
FIG. 2 illustrates an example of a health check service configured to trigger health checks for a non-HTTP application by submitting HTTP messages to an API gateway, according to one embodiment.

FIG. 2 illustrates an example of a health check service 200 configured to trigger health checks for non-HTTP application workloads by submitting HTTP messages to an API gateway 210, according to one embodiment. As shown, the health check service 200 includes an HTTP message component 205, service parameters 207, API gateway 210, event driven computing service 215, and status database 220. The health check service 200 may be used to monitor a variety of applications, services, or systems including, e.g., any of application 225, network router, 227, appliance 229, load balancer 230, or servers 231, 233. For convenience, the health check service 200 is discussed relative to application 225.

In one embodiment, the service parameters 207 specify a configuration for monitoring the health status of the application 225 (or network router, 227, appliance 229, load balancer 230, or servers 231, 233, etc.). For example, the service parameters 207 may specify a frequency at which event driven health status checks should be directed to the application 225, as well as specify one or more functions 217, 219 (or other components of application logic) to invoke in performing a health status check. Service parameters 207 may also indicate what hosts or applications should be tested as well as configuration information for such hosts, e.g., IP addresses, ports, etc. In one embodiment, the service parameters 207 may specify a service available from a set of hosts provisioned to provide that service (e.g., a fleet of VM instances 123 dynamically scaled in response to demand for production service 125 depicted in FIG. 1).

To perform a health status check, the HTTP message component 205 generates HTTP status request messages forwarded towards API gateway 110 at the frequency specified by the service parameters 207. That is, rather than direct an HTTP health status message to application 225, the HTTP health status check is directed to API gateway 210. As noted, other protocols, e.g., HTTPS, SIP, ICMP, etc., could be used to direct messages towards API gateway 210 in order to trigger event driven health checks. Using cloud based services available from Amazon Web Services (AWS) as an example, HTTP messages could be generated at a frequency specified in the service parameters 207 by AWS Route 53 (a cloud Domain Name System (DNS) service), by AWS ELB (an elastic load balancing service), or by using a variety of other web server or management systems.

The API gateway 210 generally provides a secure API endpoint for receiving messages from the HTTP message component 205. The API gateway may also generate events based on the content of a Uniform Resource Locator (URL) and HTTP headers which trigger the health check functions 219 used to perform a health check of application 225. That is, the API gateway 210 generates an event which triggers one of the health check functions 219 to perform the health check against application 225. To do so, the HTTP request generated by the message component 205 (and used to trigger each health status check) is routed to API gateway 210. Once received, the API gateway 210 decodes a URL and HTTP headers presented in the HTTP message sent to the API gateway 210. The decoded information may specify which hosts (e.g., application 225) should be health checked, the port, protocol, and any other optional parameters (such as timeout, protocol specs, message body, etc.).

Once decoded, the API gateway 210 routes the request to the event driven computing service 215, which triggers one or more of the health check functions 219. Again using a cloud based service available from AWS as an example, AWS Lambda provides a serverless compute service that runs application code (e.g., functions 217, 219) in response to events (e.g., events generated by API gateway 210 in response to messages from HTTP message component 205) and automatically manages the underlying compute resources used to execute the application code. In one embodiment, the event driven computing service 215 takes the input parameters received from the API gateway 210 (e.g., IP address, port, etc.) and invokes the appropriate health check functions 219 to evaluate application 225 identified by the input parameters.

In one embodiment, the event driven computing service 215 may query database 220 to identify members of the service for a one-to-many health check request against multiple hosts (e.g., a fleet of VM instances 123 dynamically scaled in response to demand for production service 125 depicted in FIG. 1). Once the hosts are identified, the event driven computing service 215 invokes the health check function 219 to determine a then-current health status of each identified host. In turn, the health check function 219 interacts with application 225 to perform the health check and wait for a response or timeout.

In turn, the API gateway 210 receives results from the health check functions 219 triggered to evaluate the then-current health status of application 225 and writes this information to tables in status database 220. For example, in one implementation, the status database 220 may use different tables for successful and unsuccessful health checks. Further, in such a case, the status based functions 217 could provide event driven functions triggered by the computing service 215 in response to changes to the unsuccessful tables. For example, one of the status based functions 217 could be triggered by the event driven computing service 215 after a specified count of unsuccessful health checks have happened within a time window (e.g., at least 3 tries in at least 3 seconds). In such a case, the status based function 217 may obtain a lock on records of the unsuccessful table in the status database 220 (using a variety of locking mechanism) to prevent more than one concurrent attempt to perform a corrective action against an unhealthy application. Once locked, the status based function 217 may carry out any sort of change required to restore application 225 to a healthy state (or prevent an unhealthy state of application 225 from being disruptive). For example, the status based function 217 could send out notifications to an administrator (or other appropriate party), send a message to a queue, remove server 231 or 233 from a target list used by a load balancer 230, change a DNS zone, change a routing table on network router 227, move an IP address from one appliance 229 to another (e.g., to a standby appliance), shut down and restart application 225, etc.

In one embodiment, should the health check function 219 determine that application 225 is healthy (or a certain percent or count of applications in a one-to-many status check) are healthy, the health check function 219 returns an HTTP status message 200 OK (or equivalent) to the API gateway 210, which returns same to the HTTP message component 205. Otherwise, a 400/500 error is returned, which may trigger other actions. Further, in one embodiment, health checks may continue to be performed against application 225 after it is determined to be unhealthy by prior health status checks performed by health check function 219. In such a case, should application 225 subsequently be identified as being healthy or restored, additional responses written to the database will be watched by the event driven computing service 215, and trigger one of the status based functions 217 to be invoked to restore functionality to the instance (e.g., to return a server 231 or 233 to a pool of applications receiving requests from the load balancer 220).

Figure 3:
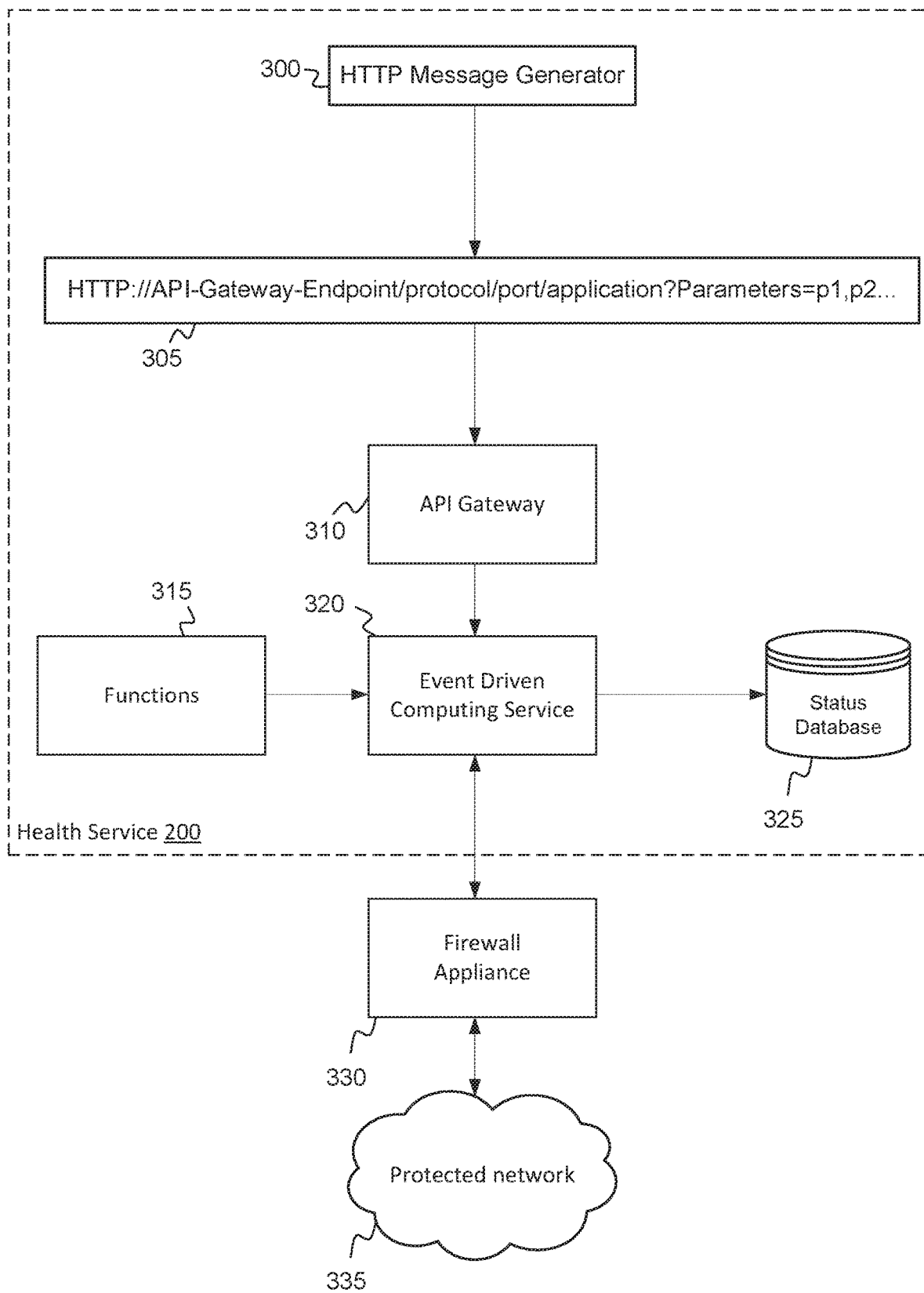
FIG. 3 illustrates an example of event driven health checks for a non-HTTP application used to monitor a firewall appliance, according to one embodiment.

FIG. 3 illustrates an example of event driven health checks for a non-HTTP application used to monitor a firewall appliance 330, according to one embodiment. As shown, the health service 200 includes an HTTP message generator 300. As described above, the HTTP message generator 300 generally directs HTTP status messages towards an API gateway endpoint hosted by the health service 200. In this example, the HTTP message generator 300 has sent URL 305 toward the API gateway 310. As shown, the URL 305 specifies an address of the API gateway 310 along with parameters used to identify what host (or hosts) should be subjected to a health status check in response to URL 305, including, e.g., a protocol, port, and application of a host to be tested. In addition, the URL 305 may include an payload of an arbitrary set of parameters, e.g., IP addresses, test parameters, or any other information used by a function 315 triggered by the event driven computing service 320 in response to URL 305 being received by API gateway 310. Once the functions 315 are invoked and executed by the event driven computing service 320 in response to information decoded from URL 305 (and associated HTTP payload as needed), the results of the status check are written to status database 325. As noted, the results may generally indicate a health status of the firewall 330 in filtering traffic directed to/from the protected network 335, as determined by functions 315.

Figure 4:
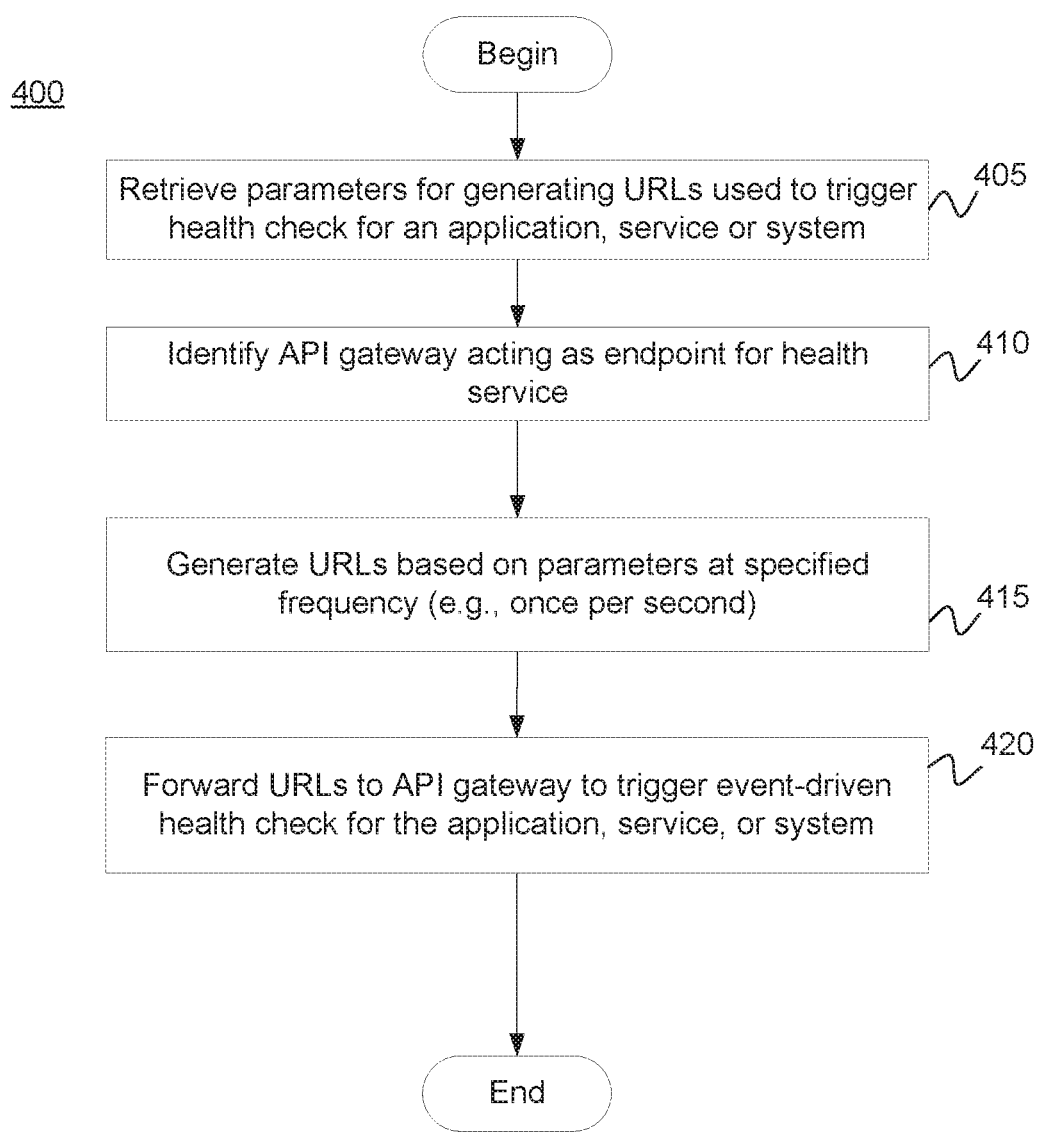
FIG. 4 illustrates a method for monitoring a health status of an application using event driven health checks for a non-HTTP application, according to one embodiment.

FIG. 4 illustrates a method 400 for monitoring a health status of an application using event driven health checks for non-HTTP application workloads, according to one embodiment. As shown, the method 400 begins at step 405 where a health service receives a set of service parameters used to specify a test configuration for a given application. For example, the parameters may specify a frequency at which event driven health status checks should be directed to an application (e.g., once per second), a format or template for generating HTTP health check messages to send to an API gateway, hosts to subject to testing (or name of a service and a mechanism to dynamically identify hosts running the service), etc. In addition, the parameters may specify a location of an API gateway to send HTTP status messages, along with a set of one or more functions triggered by an event driven computing service to invoke as part of each HTTP health status request sent to the API gateway.

At step 410, the health service identifies a location of the API gateway specified by the parameters retrieved at step 405. As described above, the API gateway provides an endpoint for HTTP status requests, which in turn act as a trigger for an event driven computing service to invoke one or more functions that actually carry out a heath check of a given application and write the results to a status database. At step 415, the HTTP message component begins generating URLs based on parameters retrieved at step 405. At step 420, URLs may be generated and directed towards the API gateway identified at step 410 at a frequency specified by the parameters, e.g., once per second. As each HTTP status request is received, the API gateway triggers an event recognized by an event driven computing service. In turn, the event driven computing service invokes one or more functions in response to the event. As noted, the functions perform the actual health check of an application, service or system. For example, in context of a firewall appliance a function may generate traffic directed towards the firewall and observe whether the firewall correctly allows or blocks the traffic. In another case, the function could determine whether a router correctly forwards traffic over a given port towards a destination. Once a health check is complete, the function writes the results of the health status check to a status database. Further, changes made to the status database may trigger additional event driven functions.

Figure 5:
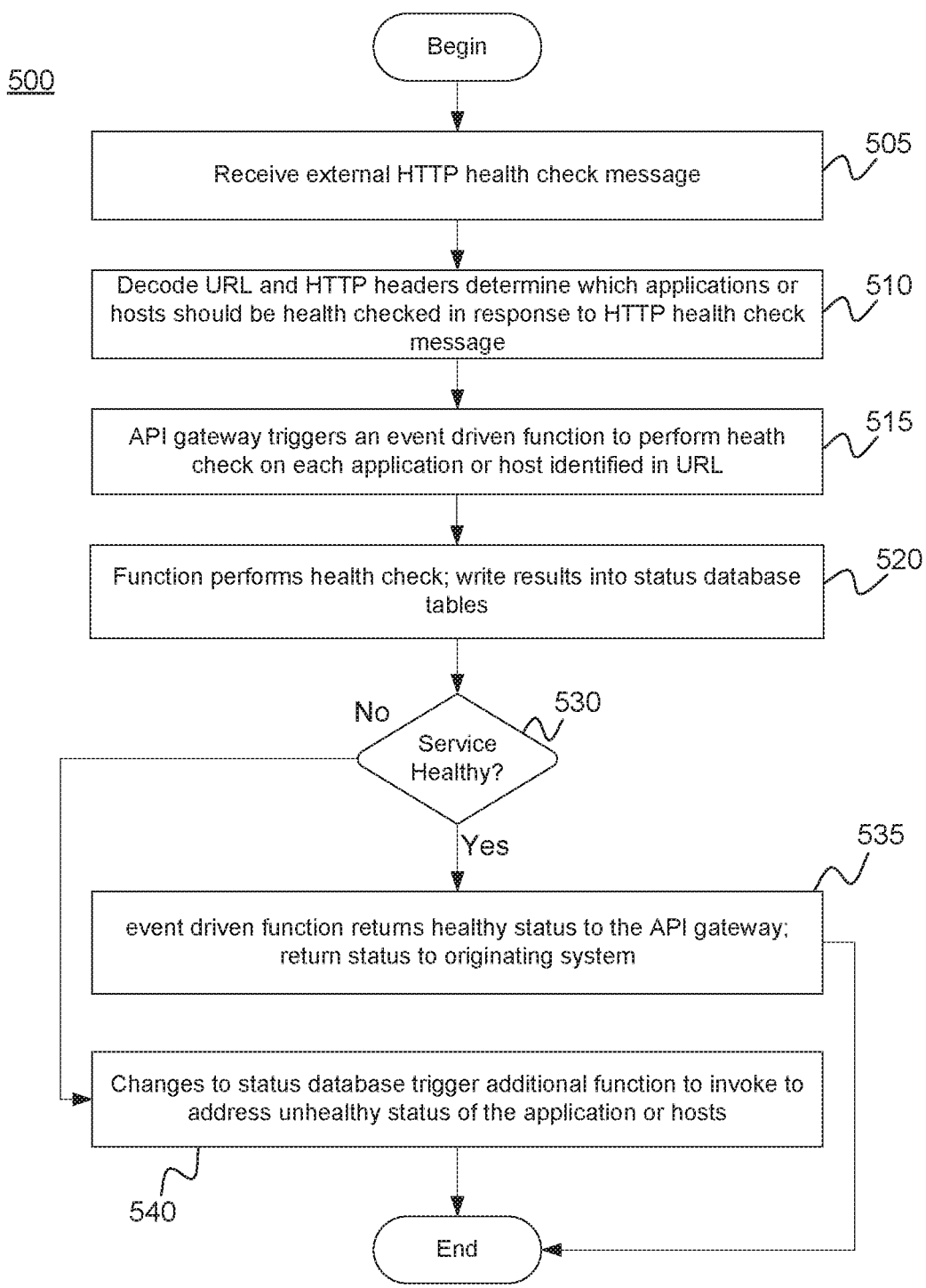
FIG. 5 illustrates a method for performing a health status check of an application using event driven health checks for a non-HTTP application, according to one embodiment.

FIG. 5 illustrates a method 500 for performing a health status check of an application using event driven health checks for non-HTTP application workloads, according to one embodiment. As shown, the method 500 begins at step 505 where an API gateway acting as a service endpoint for a health check service receives an HTTP health check request. Once received, at step 510, the API gateway decodes a URL and HTTP headers to identify a set of hosts or applications for which a health status should be determined in response to the HTTP health check message received at step 505. For example, in one embodiment, the URL and HTTP headers may identify an IP address, port, and application that should be subjected to a health status check. Alternatively, the URL and HTTP headers may identify a service to test on multiple hosts to subject to a health status check. In such a case, the API gateway may determine a set of hosts then currently running the service and trigger an event driven function to test the application on each such host.

Accordingly, at step 515, as each HTTP health status message is received, the API gateway triggers an event driven function to perform the health check on one of the application or hosts identified in the URL. Accordingly, at step 520, the function is executed and performs the health check. As noted, the function may be invoked multiple times to check the health of the application or service running on a collection of hosts in a one-to-many health status check. Further, the results of the performing the health check function may be stored in database tables of a status database. At step 530, if the service is healthy, then the event driven function returns a healthy status response (e.g., by returning an HTTP status code of 200 or the like) to the API gateway. In turn, the API gateway returns the healthy status message to the originating system (e.g., to the HTTP message component which initiated a health status check by directing a message towards the API gateway).

Otherwise, at step 535, the API gateway writes an unhealthy status to the status database. Further, in one embodiment, additional functions may monitor the status database for changes. In such a case, if any conditions specified for triggering an event driven function are satisfied (e.g., at least three failed health status checks in a five second window), then a status based function may be triggered to address the unhealthy status of the application (or mitigate the effects of the unhealthy application status). Conversely, when a health status of an application or host transitions from unhealthy to healthy, an event driven function may be triggered, e.g., to return a healthy application or host to production use.

Figure 6:
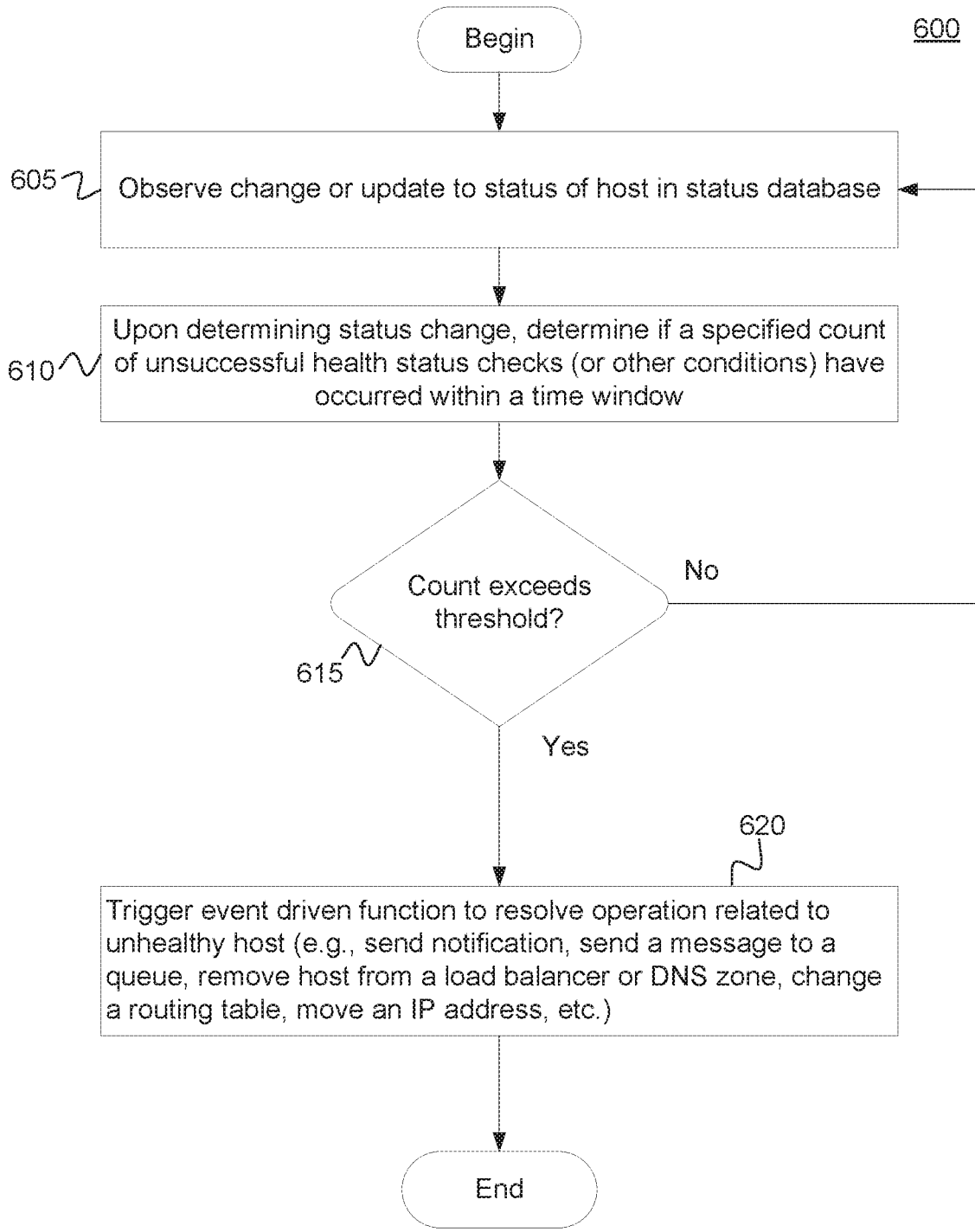
FIG. 6 illustrates a method for a health service to respond to a health status of an application, according to one embodiment.

For example, FIG. 6 illustrates a method 600 for a health service to respond to a health status of an application, according to one embodiment. As shown, the method 600 begins at step 605, where an event driven computing service observes a change or update to a status of a host, as reflected in a status database. At step 610, upon determining that the status of an application or host has changed or been updated, the event driven computing service may determine if a specified count of failed health checks (or other triggering conditions) have occurred within a time window. At step 615, if not, i.e., if the triggering conditions are not met, then the method returns to step 605, where the event driven computing service waits until observing additional changes or updates to the status of a host or application in the status database. Otherwise, if the triggering conditions are met, then at step 620, the event driven computing service triggers a status based function to perform the appropriate resolve operation to address an unhealthy application host (e.g., send notification, send a message to a queue, remove host from a load balancer or DNS zone, change a routing table, move an IP address, etc.) As noted, if application or host has failed and subsequently returned to a healthy state, additional health status updates written to the status database may trigger additional event driven functions, e.g., to return a healthy application or host to production use.

Figure 7:
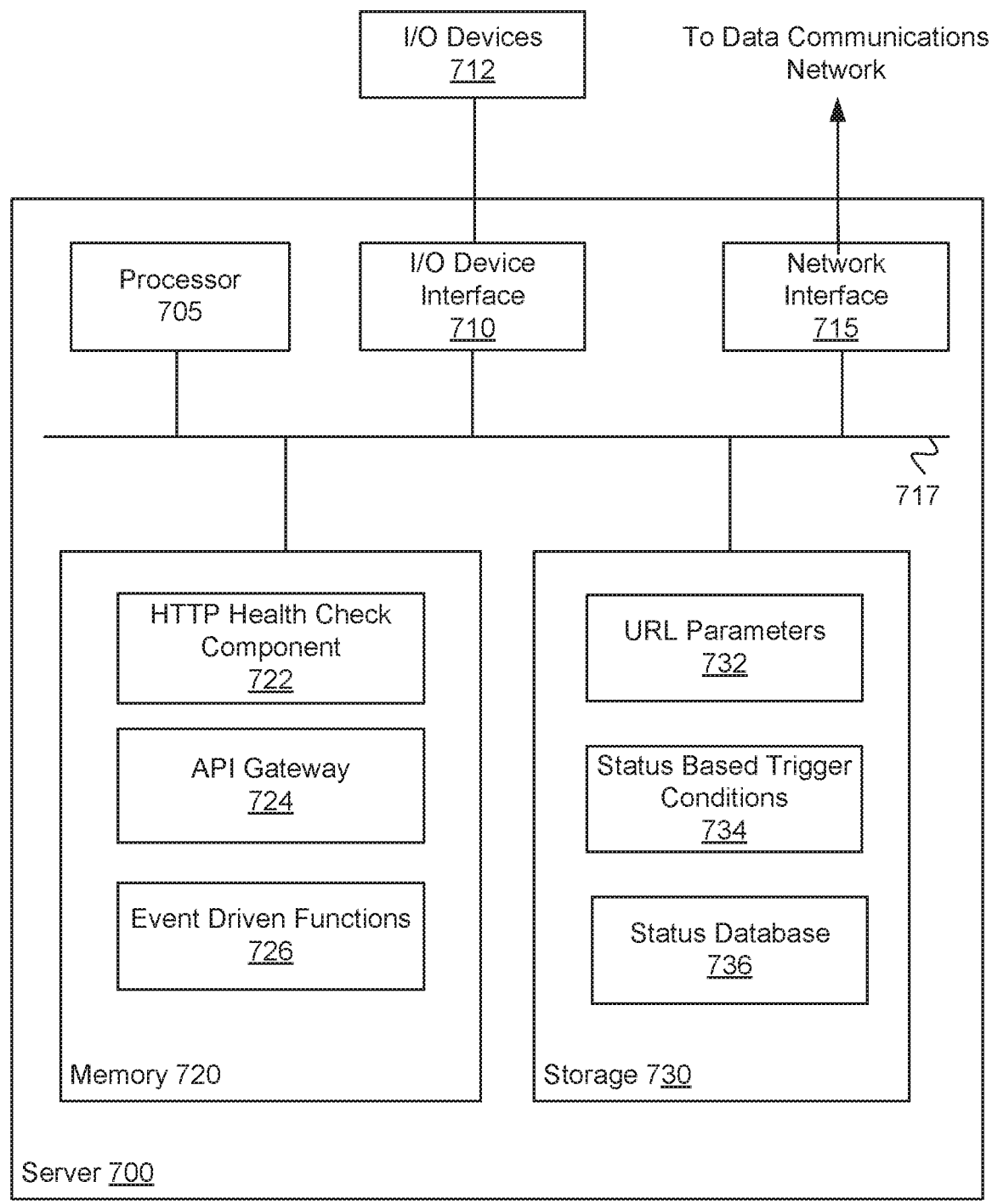
FIG. 7 illustrates an example computing system used to host components of the health service in FIGS. 1-3, according to one embodiment.

FIG. 7 illustrates an example computing system used to host components of the health service in FIGS. 1-3, according to one embodiment.

FIG. 7 illustrates an example computing system used to host components of the deployment manager illustrated in FIGS. 1-3, according to one embodiment. As shown, the computing system 700 includes, without limitation, a central processing unit (CPU) 705, a network interface 715, a memory 720, and storage 730, each connected to a bus 717. Computing system 700 also includes an I/O device interface 710 connecting I/O devices 712 (e.g., keyboard, display and mouse devices) to the computing system 700. In context of this disclosure, the components shown in computing system 700 correspond to both physical computing systems (e.g., a system in a data center) as well as components of a virtual machine (VM) instance executing within a computing cloud. Further, a cloud computing service provider could offer components of the health service as web services accessed using a network browser or dedicated console application (e.g., console applications to configure and monitor the event driven computing service, API gateway, and HTTP status message generator). Further still, while shown as running on a single computing server 700, components in memory 720 and storage 730 may be deployed across multiple computing servers.

CPU 705 retrieves programming instructions and application data stored in the memory 720 and storage 730. The interconnect 717 is used to transmit programming instructions and application data between the CPU 705, I/O device interface 710, storage 730, network interface 715, and memory 720. Note, CPU 705 is included to be representative of a single CPU, multiple CPUs, a single CPU having multiple processing cores, and the like, and the memory 720 is generally included to be representative of a random access memory. The storage 730 may be a disk drive or flash storage device. Although shown as a single unit, the storage 730 may be a combination of fixed and/or removable storage devices, such as fixed disc drives, removable memory cards, optical storage, network attached storage (NAS), or a storage area-network (SAN).

Illustratively, the memory 720 includes an HTTP message component 722, an API gateway 724, and event driven functions 726. Storage 730 includes URL generation parameters 732, health check metrics 734, and status database 736. As described, the HTTP message component 722 is generally configured to generate HTTP status messages based on a set of URL parameters 732. The HTTP status messages are then directed towards the API gateway 724 at a frequency specified by service parameters specified for monitoring a given application or service. The API gateway 724 generally provides a secure API endpoint for receiving messages from the HTTP message component 722. The API gateway 724 may also generate events based on the content of a URL and HTTP headers which trigger the event driven functions 726 to perform a health check of an application or host. In addition to event driven functions 726 triggered by messages received by API gateway 724, the event driven functions 726 may also include functions triggered by status based trigger conditions 734. For example, the status based trigger conditions 734 may be used to evaluate whether to invoke an event driven function 726 in response to changes or updates to the health status of an application or host, as reflected in the status database 736.

In the preceding, reference is made to embodiments presented in this disclosure. However, the scope of the present disclosure is not limited to specific described embodiments. Instead, any combination of the preceding features and elements, whether related to any given embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed above are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present invention, other and further embodiments of the invention may be devised without departing from the basic scope thereof, and the scope thereof is determined by the claims that follow.

What is claimed is:

1. A non-transitory computer-readable medium storing instructions executable to perform an operation for monitoring a health status of a computing application, the operation comprising:

receiving, at an application programming interface (API) gateway, a request comprising a Hypertext Transfer Protocol (HTTP) status request message, the request specifying to perform a non-HTTP health status check of a non-HTTP application on at least a first computing host configured to respond to HTTP health status checks, wherein the HTTP and non-HTTP health status checks evaluate HTTP and non-HTTP loads of the first computing host, respectively;

in response to the request, invoking at least a first event-driven function by operation of one or more computer processors when executing the instructions, wherein the first event-driven function receives a set of input parameters determined based at least on the HTTP status request message, wherein the first event-driven function performs the non-HTTP health status check of the non-HTTP application on the first computing host;

upon receiving a result of the non-HTTP health status check performed by the first event-driven function, writing the result to a status database that includes healthy-status and unhealthy-status tables storing indications of successful and unsuccessful status checks, respectively;

determining a healthy or unhealthy overall status of the non-HTTP application, based on evaluating one or more event-triggering conditions associated with the received result, wherein the one or more event-triggering conditions specify at least (i) a count of non-HTTP health status checks sharing the same status selected from a healthy status and an unhealthy status and (ii) a time window to which the count pertains; and upon determining, based on the one or more event-triggering conditions being satisfied, that the non-HTTP application has the unhealthy overall status, invoking at least a second event-driven function that includes a corrective action configured to revert the non-HTTP application to the healthy overall status, wherein the second event-driven function is configured to perform the corrective action upon successfully performing a locking mechanism on records of the unhealthy status table, in order to prevent more than one corrective action from being concurrently performed on the non-HTTP application.

2. The non-transitory computer-readable medium of claim 1, wherein the second event-driven function performs one or more of: sending a notification message reflecting the healthy or unhealthy overall status of the non-HTTP application, removing the non-HTTP application from a load balancer target list or from a domain name system (DNS) zone, modifying a network routing table, moving an Internet Protocol (IP) address used by the non-HTTP application, and running an instance of the non-HTTP application on a second computing host.

3. The non-transitory computer-readable medium of claim 1, wherein the request includes a Uniform Resource Locator (URL) and HTTP headers encoding one or more of a port, a protocol, a timeout value, protocol options, and IP address associated with the non-HTTP application.

4. The non-transitory computer-readable medium of claim 1, wherein the request specifies to perform the non-HTTP health status check on a plurality of instances of the non-HTTP application, wherein the first event-driven function is invoked for each of the plurality of instances of the non-HTTP application.

5. A system to monitor a health status of a computing application, the system comprising:

one or more computer processors; and a memory storing instructions, which, when executed on the one or more computer processors, perform an operation comprising:

receiving, at an application programming interface (API) gateway, a request comprising a Hypertext Transfer Protocol (HTTP) status request message, the request specifying to perform a non-HTTP health status check of a non-HTTP application on at least a first computing host configured to respond to HTTP health status checks, wherein the HTTP and non-HTTP health status checks evaluate HTTP and non-HTTP loads of the first computing host, respectively;

in response to the request, invoking at least a first event-driven function, wherein the first event-driven function receives a set of input parameters determined based at least on the HTTP status request message, wherein the first event-driven function performs the non-HTTP health status check of the non-HTTP application on the first computing host;

upon receiving a result of the non-HTTP health status check performed by the first event-driven function, writing the result to a status database that includes healthy-status and unhealthy-status tables storing indications of successful and unsuccessful status checks, respectively;

determining a healthy or unhealthy overall status of the non-HTTP application, based on evaluating one or more event-triggering conditions associated with the received result, wherein the one or more event-triggering conditions specify at least (i) a count of non-HTTP health status checks sharing the same status selected from a healthy status and an unhealthy status and (ii) a time window to which the count pertains; and upon determining, based on the one or more event-triggering conditions being satisfied, that the non-HTTP application has the unhealthy overall status, invoking at least a second event-driven function that includes a corrective action configured to revert the non-HTTP application to the healthy overall status, wherein the second event-driven function is configured to perform the corrective action upon successfully performing a locking mechanism on records of the unhealthy status table, in order to prevent more than one corrective action from being concurrently performed on the non-HTTP application.

6. The system of claim 5, wherein the HTTP status request message comprises a Uniform Resource Locator (URL) and HTTP headers encoding one or more of a port, a protocol, a timeout value, protocol options, and IP address associated with the non-HTTP application.

7. The system of claim 5, wherein the request specifies to perform the non-HTTP health status check on a plurality of instances of the non-HTTP application, wherein the first event-driven function is invoked for each of the plurality of instances of the non-HTTP application.

8. The system of claim 7, wherein the non-HTTP health status check returns either a healthy or unhealthy status for the non-HTTP application based on a count of the plurality of instances of the non-HTTP application having a result that is generated by the first event-driven function and that has the healthy or unhealthy status.

9. A computer-implemented method for monitoring a health status of a computing application, the computer-implemented method comprising:

receiving, at an application programming interface (API) gateway, a request comprising a Hypertext Transfer Protocol (HTTP) status request message, the request specifying to perform a non-HTTP health status check of a non-HTTP application on at least a first computing host configured to respond to HTTP health status checks, wherein the HTTP and non-HTTP health status checks evaluate HTTP and non-HTTP loads of the first computing host, respectively;

in response to the request, invoking at least a first event-driven function by operation of one or more computer processors, wherein the first event-driven function receives a set of input parameters determined based on at least the HTTP status request message, wherein the first event-driven function performs the non-HTTP health status check of the non-HTTP application on the first computing host;

upon receiving a result of the non-HTTP health status check performed by the first event-driven function, writing the result to a status database that includes healthy-status and unhealthy-status tables storing indications of successful and unsuccessful status checks, respectively;

determining a healthy or unhealthy overall status of the non-HTTP application, based on evaluating one or more event-triggering conditions associated with the received result, wherein the one or more event-triggering conditions specify at least (i) a count of non-HTTP health status checks sharing the same status selected from a healthy status and an unhealthy status and (ii) a time window to which the count pertains; and upon determining, based on the one or more event-triggering conditions being satisfied, that the non-HTTP application has the unhealthy overall status, invoking at least a second event-driven function that includes a corrective action configured to revert the non-HTTP application to the healthy overall status, wherein the second event-driven function is configured to perform the corrective action upon successfully performing a locking mechanism on records of the unhealthy status table, in order to prevent more than one corrective action from being concurrently performed on the non-HTTP application.

10. The computer-implemented method of claim 9, wherein the second event-driven function performs one or more of: sending a notification message reflecting the healthy or unhealthy overall status of the non-HTTP application, removing the non-HTTP application from a load balancer target list or from a domain name system (DNS) zone, modifying a network routing table, moving an Internet Protocol (IP) address used by the non-HTTP application, and running an instance of the non-HTTP application on a second computing host.

11. The computer-implemented method of claim 9, wherein the request includes a Uniform Resource Locator (URL) and HTTP headers encoding one or more of a port, a protocol, a timeout value, protocol options, and IP address associated with the non-HTTP application.

12. The computer-implemented method of claim 9, wherein the request specifies to perform the non-HTTP health status check on a plurality of instances of the non-HTTP application, wherein the first event-driven function is invoked for each of the plurality of instances of the non-HTTP application.

13. The computer-implemented method of claim 9, further comprising returning, in response to the HTTP status request message, a response reflecting either the healthy or unhealthy overall status of the non-HTTP application.

14. The non-transitory computer-readable medium of claim 1, wherein the first computing host comprises an appliance is configured to respond to an HTTP Secure (HTTPS) status check, an Internet Control Message Protocol (ICMP) status check, and a Session Initiation Protocol (SIP) status check, respectively; wherein the non-HTTP status check ascertains an overall health status of the non-HTTP application with relative accuracy compared to each of the HTTPS status check, the ICMP status check, and the SIP status check;

wherein the request includes a Uniform Resource Locator (URL) and HTTP headers encoding each parameter selected from a port, a protocol, a timeout value, protocol options, and IP address associated with the non-HTTP application, wherein each parameter is decoded by the API gateway.

15. The non-transitory computer-readable medium of claim 14, wherein the request is of a plurality of requests received from an HTTP message component at a rate corresponding to a specified health-check frequency, wherein in response to the plurality of requests, the first event-driven function is invoked at the rate corresponding to the specified health-check frequency;

wherein the appliance comprises a firewall appliance, wherein the non-HTTP application comprises a firewall application configured to monitor traffic flows through the firewall appliance in a private network, the firewall appliance comprising a primary firewall appliance, wherein a standby application comprises a standby firewall appliance;

wherein the non-HTTP status check performed by the first event-driven function includes:

generating traffic directed towards a firewall and ascertaining whether the firewall correctly permits or blocks the generated traffic; and determining whether a router correctly forwards traffic over a specified port towards a specified destination.

16. The non-transitory computer-readable medium of claim 1, wherein the second event-driven function performs, in respective instances, each corrective action selected from:

sending a notification message reflecting the healthy or unhealthy overall status of the non-HTTP application;

removing the non-HTTP application from a load balancer target list specifying a pool of applications eligible to receive requests from the load balancer, each application executing on a respective virtual machine (VM) instance;

removing the non-HTTP application from a domain name system (DNS) zone;

modifying a network routing table on a network router to reroute traffic to a standby appliance;

moving an Internet Protocol (IP) address used by the non-HTTP application; and running an instance of the non-HTTP application on a second computing host;

wherein each corrective action is only performed when records of the unhealthy-status table are successfully locked by the second event-driven function.

17. The non-transitory computer-readable medium of claim 16, wherein the request specifies to perform the non-HTTP health status check on a plurality of instances of the non-HTTP application, wherein the first event-driven function is invoked for each of the plurality of instances of the non-HTTP application, wherein the operation further comprises returning, in response to the HTTP status request message, a response reflecting either the healthy or unhealthy overall status of the non-HTTP application;

wherein the non-HTTP health status check returns either the healthy or unhealthy overall status for the non-HTTP application based on a count of the plurality of instances of the non-HTTP application having a result that is generated by the first event-driven function and that has the healthy or unhealthy status.

18. The non-transitory computer-readable medium of claim 1, wherein the request is of a plurality of requests received from an HTTP message component at a rate corresponding to a specified health-check frequency, wherein in response to the plurality of requests, the first event-driven function is invoked at the rate corresponding to the specified health-check frequency.

19. The non-transitory computer-readable medium of claim 18, wherein the first computing host comprises a firewall appliance, wherein the non-HTTP application comprises a firewall application configured to monitor traffic flows through the firewall appliance in a private network, the firewall appliance comprising a primary firewall appliance, wherein a standby application comprises a standby firewall appliance.

20. The non-transitory computer-readable medium of claim 19, wherein the non-HTTP status check performed by the first event-driven function includes at least one of:

generating traffic directed towards a firewall and ascertaining whether the firewall correctly permits or blocks the generated traffic; and determining whether a router correctly forwards traffic over a specified port towards a specified destination.

21. The non-transitory computer-readable medium of claim 19, wherein the non-HTTP status check performed by the first event-driven function includes:

generating traffic directed towards a firewall and ascertaining whether the firewall correctly permits or blocks the generated traffic; and determining whether a router correctly forwards traffic over a specified port towards a specified destination.

* * * * *